June 5, 1962  J. C. LANIUS, JR  3,037,221
METHOD OF ASSEMBLY OF CONICAL WASHER ON A THREADED FASTENER
Filed Aug. 26, 1959

INVENTOR.
James C. Lanius, Jr.
BY
Olson & Trexler
attys

United States Patent Office 3,037,221
Patented June 5, 1962

3,037,221
METHOD OF ASSEMBLY OF CONICAL WASHER ON A THREADED FASTENER
James C. Lanius, Jr., Elgin, Ill., assignor to Illinois Tool Works, Chicago, Ill., a corporation of Illinois
Filed Aug. 26, 1959, Ser. No. 836,139
2 Claims. (Cl. 10—10)

This invention relates to a fastener assembly. More specifically, it relates to the preassembly of a threaded fastener and a dished or cone type washer element.

In the past it has been found that where a cone-type washer was preassembled with a screw blank and threads were subsequently extruded by the rolled thread method, it was impossible to extend the threads above the plane which passed through the lower outer periphery of the washer. When the assembly was inserted in a workpiece aperture, and particularly a very thin workpiece, the compression and axial deflection of the washer to a semi-flattened condition exposed the unthreaded portion of the shank and hence there were no further threads available on the screw shank for engagement with the workpiece.

An object of this invention is to provide an improved fastener unit including a screw and a cone washer rotatably assembled on said screw.

A more specific object of this invention is to provide a fastener unit comprising a screw and cone washer wherein threads on the shank of the screw extend into the concavity of the cone washer. A further object is to provide threads on the shank of the fastener close enough to the lower extremity of the head that they will be available for engagement with the workpiece when the washer is flattened by the screw head against the workpiece.

Referring now more specifically to the drawings wherein.

Figure 1:
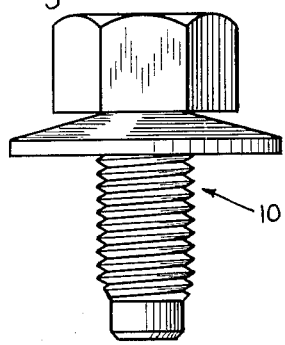
FIG. 1 is a view in elevation of an embodiment of this invention.

This assembly comprising the invention is generally designated as 10 and includes a screw threaded member 11 having a head 12 and a shank 14. The shank has a threaded portion 15 extending from adjacent its tip or free end to a point spaced from the clamping face 16 of the head so as to provide a shank portion 18 which is unthreaded. Portion 18 which forms the peripheral washer-receiving portion of the shank is of a lesser diameter than either the major diameter of threaded portion 15 or the head 12. The axial extent of portion 18 is at least equal to or slightly greater than the material thickness of the washer to be accommodated thereon, for purposes best set forth hereinafter.

Figure 5:
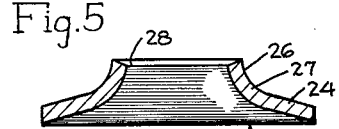
FIG. 5 is a cross section of a washer of the type utilized in an embodiment of this invention.

Apertured washer 22 initially has substantially a frusto-conical shape in cross section, as best seen in FIG. 5. The lower portion 24 has an included or apical angle of the type normally found in cone spring washers, this angle being a function of the material thickness, the type of material used, the outer diameter of the washer and the work load to be accommodated. The continuous, uninterrupted inner portion or neck 26 extends upwardly, in the illustrated embodiment, at a more acute included or apical angle than the apical angle of lower portion 24. The neck 26 is blended into lower portion 24 by a large radius of curvature 27. In some instances where the parts are small in diametral size and made of thin material, the neck 26 may approach the form of a cylinder. The washer 22 is a stamped sheet metal product with the neck 26 being drawn or formed as a step in the manufacture of the washer. Usually, the washer is of heat treatable type material and is in the soft condition prior to its application to the screw as will be set forth hereinafter. Aperture 28 is concentric with the axis of washer 22 in the embodiment shown, and in its initial condition is greater in diameter than the major diameter of the threaded portion of the screw but lesser than the diametral extent of the clamping face 16 of the head.

Figure 2:
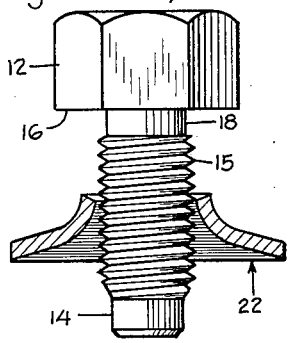
FIG. 2 is a partial sectional view of an embodiment of this invention showing the washer in its initial deformable configuration as it is being applied axially on a threaded screw.
Figure 3:
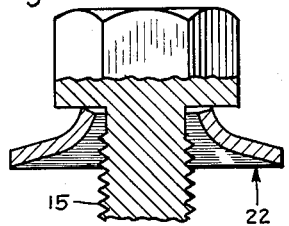
FIG. 3 shows the washer in this embodiment in application position but before deformation.
Figure 4:
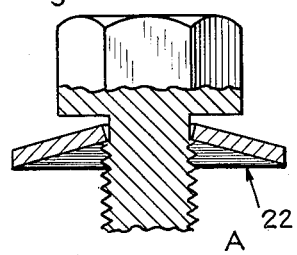
FIG. 4 is a partial sectional view showing the completed assembly.

In manufacturing the assembly, the washer 22 is telescopically assembled with the screw in the fashion shown in FIG. 2 until the inner margin of the washer neck 26 is positioned adjacent the clamping face 16 of the screw head as shown in FIG. 3.

Figure 7:
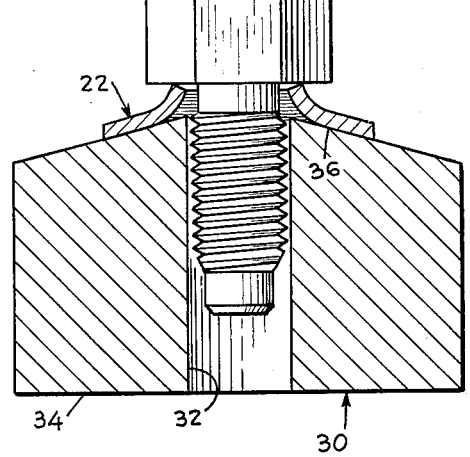
FIG. 7 shows a screw and washer of an embodiment of this invention positioned in a suitable punch and die prior to the deformation of the washer to assembled position.
Figure 8:
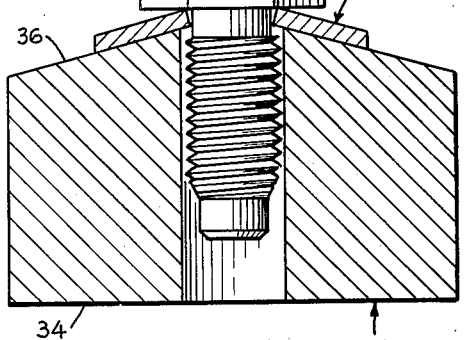
FIG. 8 is a view similar to FIG. 7 showing the washer in its final assembled relationship with the screw after deformation.

Referring more particularly now to FIGS. 7 and 8, a die 30 is provided with a central bore 32 whose diameter is greater than the major diameter of the screw and suitable for telescopically accepting same. The lower end of the die 30 is machine suppported as is common in the art. The opposite or upper surface 36 is convex upwardly, as seen in the drawings, and is frusto-conical in cross section with its included angle being substantially the same as the included angle or lower portion 24 of the washer 22. The telescopically assembled screw and washer are seated in the die 30 with the concave free side of washer 22 in juxtaposition to and supported by the complimentary surface 36 of the die. The clamping face 16 of the screw rests on the neck 26 of the washer and the shank 14 extends into bore 32.

Positioned above the head 12 of the screw and coaxial with the bore 32 is a punch 40 attached by suitable means to a power source, which is known in the art, and therefore not shown, for the application of an axial force against the upper extremity of the head 12 of the screw. The application of an axial force in the direction of arrow "A" against the head of the screw, while the washer 22 is supported by die 30, moves the screw and its clamping face 16 axially downwardly, as viewed in the drawing, against the neck 26 thereby deforming the upwardly extending neck 26 downwardly and radially inwardly until it substantially conforms to the configuration of the die. Thus, clamping face 16 performs the secondary function of being an anvil for the deformation of the neck 26. This distortion of material, as best seen in FIG. 8, results not only in an axial movement of the continuous washer neck 26 but also radially reduces the peripheral size of the aperture 28 so that the inner diameter of the washer aperture 28, while greater than the unthreaded portion 18 of the screw shank 14 is less than the major diameter of the threaded portion 15. The axial extent of unthreaded portion 18 of shank 14 is controlled so that it is at least equal to, if not slightly greater than the material thickness of washer 22, for the acceptance of material moved during the radial and axial deformation of neck 26 to its final position. Normally, washer 22 is free to rotate relative to screw 11 in its final position of assembly and if it is desired to impart spring characteristics to washer 22 the assembly can be heat treated as a unit.

Figure 9:
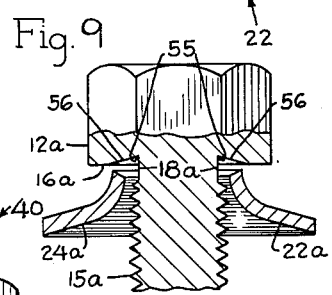
FIG. 9 is an elevation in section of a modification to the present invention prior to deformation of the washer.

A modification to the present invention is disclosed in FIG. 9 wherein similar parts are designated by similar numerals with the addition of the suffix "a." In this embodiment the clamping face 16a of the screw head 12a is axially relieved adjacent the juncture of unthreaded portion 18a with head 12a. The resultant annular groove 55 is frusto-conical in section with its downwardly and inwardly facing tapered side wall 56 presenting an apical angle substantially equal to the included angle formed by lower portion 24a of the washer 22a. The groove 55 can be formed by any suitable means such as by a forming operation in the initial heading of the screw blank or by cutting same in a screw machine (for example) subsequent to the heading operation.

The assembly of the threaded screw and washer in this embodiment is substantially identical to the method shown in FIGS. 7 and 8 and disclosed hereinabove. In the present instance, this embodiment is illustrated in a condition similar to that found in FIGS. 3 and 7 of the first embodiment wherein the washer has been telescoped onto the screw but has not as yet been deformed to final assembled configuration. On application of pressure to head 12a, the inwardly and downwardly facing side wall 56 assists the neck 26a to positively assume its final configuration by cooperating with and in opposition to the convex surface 36 of a suitable tool such as die 30. In addition, the provision of groove 55 for accepting the inner margin of washer 22a permits the threads of portion 15a to extend closer to the clamping face 16a. If desired, the groove 55 can be axially deeper adjacent the shank and blend outwardly to the edge of head 12a, to the point where it is normally joined by clamping face 16a, not shown in the drawings.

Thus, the described embodiments of this invention provide a preassembled screw and cone-type washer having the threads on the shank of the screw extending axially above the plane passing through the lower outer periphery of the washer when the washer is in an unstressed condition.

Figure 6:
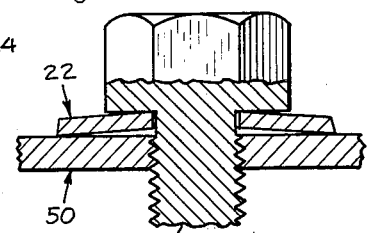
FIG. 6 is a sectional view of an embodiment of the invention in final applied position relative to a workpiece with the washer in a deflected condition.

As best seen in FIG. 6, the washer 22 will deflect axially when force is applied to it through the clamping face 16 as the screw 14 is telescopically applied to a workpiece 50. It will be noted that threads are available for substantially the entire length of the shank of screw 14 for engagement with workpiece or nut 50 as the washer is deflected to a clamped position.

For purposes of illustration, two embodiments of this invention have been disclosed herein but obviously the invention is not limited to these embodiments but is capable of other modifications and changes without departing from the spirit and scope of the appended claims.

The invention is claimed as follows:

1. The method of fabricating a fastener unit comprising the steps of partially threading the shank of a headed screw member to provide an unthreaded portion on said shank adjacent the head having a diameter less than the major diameter of the threaded portion, forming a washer with a continuous inner periphery and initially in cross section having its outer body portion of a frusto-conical configuration with the inner portion of the washer body adjacent the aperture deflected upwardly of the frusto-conical body portion so that the margin of the washer extends substantially beyond the convex side of said frusto-conical portion of the body to define an aperture having an internal diameter greater than the diameter of the threaded portion of the screw shank, positioning said washer with the inner deflected portion of said body in juxtaposition to the screw head, applying an axial force to the head of the screw while supporting only the frusto-conical surface defining the outer body portion of said washer thereby radially inwardly and axially deforming the inner body portion of said washer to assume substantially the same apical angle as the outer body portion and simultaneously reducing the aperture diameter to a diameter less than the major diameter of the threaded portion of the screw body whereby said washer is captured on said screw against axial movement relative thereto.

2. The method claimed in claim 1, wherein the inner deflected portion of the washer body is positioned in an annular groove on the clamping face of the screw adjacent its juncture with the shank and with the groove having a downwardly and outwardly extending wall of substantially the same apical angle as defined by the apical angle of the frusto-conical body portion whereby the applied axial force cams the inner deflected portion of the washer body inwardly and downwardly to assume substantially the same apical angle of the wall of the groove and the frusto-conical body portion of the washer.

References Cited in the file of this patent

UNITED STATES PATENTS

| 721,559 | Goodridge | Feb. 24, 1903 |
| 1,868,415 | Gundersen et al. | July 19, 1932 |
| 2,139,590 | Jessop | Dec. 6, 1938 |
| 2,257,479 | Olson | Sept. 30, 1941 |
| 2,289,066 | Olson | July 7, 1942 |
| 2,311,299 | Olson | Feb. 16, 1943 |
| 2,391,308 | Honneman | Dec. 18, 1945 |
| 3,009,176 | Knocke | Nov. 21, 1961 |

FOREIGN PATENTS

| 210,162 | Germany | May 22, 1909 |